United States Patent
Redondo Carracedo et al.

(10) Patent No.: US 10,321,522 B2
(45) Date of Patent: Jun. 11, 2019

(54) ICE PROTECTION DEVICE AND METHOD

(71) Applicant: Airbus Defence and Space S.A., Getafe (ES)

(72) Inventors: Francisco José Redondo Carracedo, Getafe (ES); Daniel Maldonado-Friedman, Getafe (ES); Irma Villar Iturbe, Getafe (ES)

(73) Assignee: AIRBUS DEFENCE AND SPACE S.A., Getafe (ES)

( * ) Notice: Subject to any disclaimer, the term of this patent is extended or adjusted under 35 U.S.C. 154(b) by 417 days.

(21) Appl. No.: 15/283,572

(22) Filed: Oct. 3, 2016

(65) Prior Publication Data

US 2017/0099702 A1  Apr. 6, 2017

(30) Foreign Application Priority Data

Oct. 5, 2015  (EP) .................................... 15382482

(51) Int. Cl.
*H05B 6/10* (2006.01)
*B64D 15/12* (2006.01)
(Continued)

(52) U.S. Cl.
CPC .............. *H05B 6/10* (2013.01); *B64D 15/12* (2013.01); *H05B 6/06* (2013.01); *H05B 6/106* (2013.01)

(58) Field of Classification Search
CPC ... H05B 6/02; H05B 6/04; H05B 6/06; H05B 6/10; H05B 6/105; H05B 6/106;
(Continued)

(56) References Cited

U.S. PATENT DOCUMENTS 2,762,897 A * 9/1956 Vrooman ............... B64D 15/12
219/202
3,022,412 A * 2/1962 Waters ................... B64D 15/12
219/549
(Continued)

FOREIGN PATENT DOCUMENTS

DE  102008063409  7/2010
EP  2919555  9/2015

OTHER PUBLICATIONS

European Search Report, dated Feb. 17, 2016, priority document.

*Primary Examiner* — Hung D Nguyen
(74) *Attorney, Agent, or Firm* — Greer, Burns & Crain, Ltd.

(57) ABSTRACT

An ice protection device for an aircraft surface having a composite layer. The device comprises a layer of electrically conductive material configured to be located at an outer face of the composite layer and adapted to be heated by electromagnetic induction. The device also comprises a perimetric monophasic winding to heat an edge surrounding a delimited area of the electrically conductive layer, an inner monophasic or multiphasic winding to heat the inside of the delimited area of the perimetric monophasic winding, a control unit, to independently control the outer winding and the inner winding, the control unit being adapted to continuously operate the outer winding to avoid the formation of ice in the edge of the delimited area and also to operate the inner winding when the ice formed inside the delimited area is to be detached.

15 Claims, 3 Drawing Sheets

(51) Int. Cl.
*H05B 6/06* (2006.01)
*H05B 6/36* (2006.01)

(58) Field of Classification Search
CPC . H05B 6/109; H05B 6/36; H05B 6/38; H05B 6/40; H05B 6/44; B64D 15/12; B64D 15/14; B64D 15/20; B64D 15/22
USPC ....... 219/600, 601, 635, 645, 660, 662, 671, 219/672, 675, 676, 677
See application file for complete search history.

(56) References Cited

U.S. PATENT DOCUMENTS

| | | | |
|---|---|---|---|
| 2008/0251642 A1* | 10/2008 | Boschet | B64D 15/12 244/134 D |
| 2015/0260047 A1 | 9/2015 | Gieras et al. | |
| 2016/0122025 A1* | 5/2016 | Hull | B64D 15/12 219/634 |
| 2017/0361938 A1* | 12/2017 | Hull | B64D 15/22 |

* cited by examiner

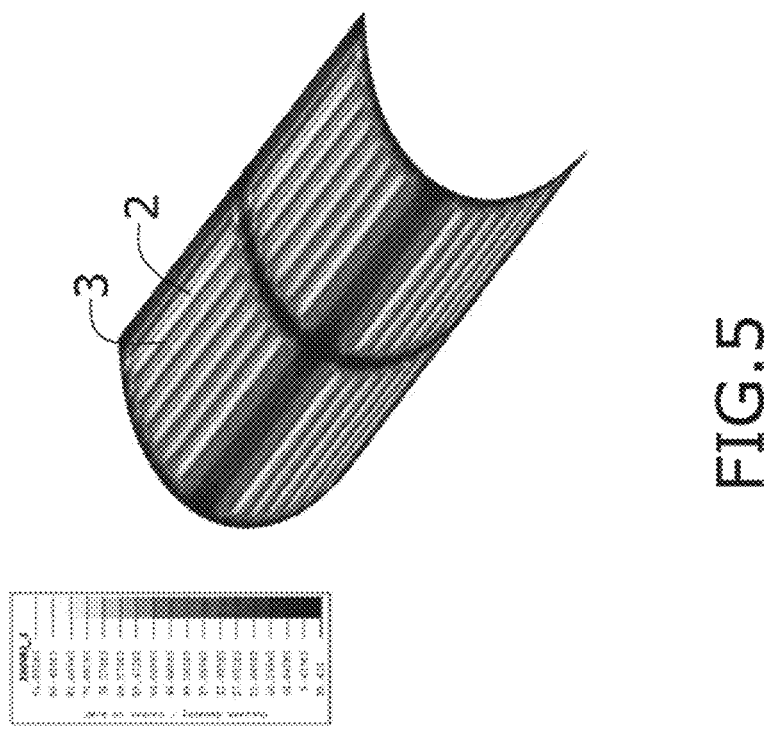

ICE PROTECTION DEVICE AND METHOD

CROSS-REFERENCES TO RELATED APPLICATIONS

This application claims the benefit of the European patent application No. 15382482.6 filed on Oct. 5, 2015, the entire disclosures of which are incorporated herein by way of reference.

FIELD OF THE INVENTION

This invention relates to the heating of composite panels by means of electromagnetic induction. Its use is intended for the ice protection of aircraft aerodynamic surfaces affected by ice formation, such as, wing, nacelle, HTP, propeller, rotor blade, radome, etc.

BACKGROUND OF THE INVENTION

Ice formation may occur at various aerodynamic surfaces of an aircraft when exposed to icing conditions. Ice accretion on an aerodynamic surface can modify the aerodynamic field around it, potentially leading to adverse effects on the aircraft's performance, or may hit and damage other parts of the aircraft after shedding.

In order to prevent or reduce ice formation, several ice protection devices and methods have been developed. There are two different approaches when dealing with ice protection systems: allowing ice formation to a certain extent and removing it afterwards (de-icing) or avoiding any ice formation from occurring in the first place (anti-icing).

The most common anti-icing systems are those based on heating the inner face of the aerodynamic surface with hot air bled from the engine compressor, having the external surface heated by conduction through the material. These types of systems have a low overall efficiency. In modern aircraft, where the use of composite materials is increasing, this system proves to be of very low efficiency when heating aerodynamic surfaces made of carbon fiber reinforced polymer (CFRP) due to the material's poor thermal conductivity. Moreover, CFRP laminates are limited in temperature to values much lower than those for metallic materials.

Alternatives to ice protection of aircraft aerodynamic surfaces exist. Systems can be based on the modification of external surface properties to avoid ice formation, either on metallic parts by modification of the nanometric rugosity or by depositing different products impregnated in adhesives. Another group uses direct heating of aerodynamic surfaces by means of air systems or similar, but a great part of the new contributions use variants of heating by Joule effect combined with more or less conventional systems, with AC or DC current depending on requirements, by means of electrothermal effects or even with the use of carbon nanotubes.

Another alternative is to heat the aerodynamic surfaces by electromagnetic induction: eddy currents are formed in electrically conductive materials which then heat the material by Joule effect. This method has been studied for its use with metallic parts of turbines, as well as with composite materials.

The issue of using electromagnetic induction is that, in order to generate the eddy currents, a thin layer of an electrically conductive material (e.g., metal) is needed, which is not a feature of laminates made of CFRP. Moreover, a specific winding distribution is needed to induce the currents on the conductive layer in such a way that they are uniformly spread and the heating target is reached in every area.

The aim of ice protection systems based on heating is to increase the temperature of the aerodynamic surface's outer layer to a temperature that impedes ice formation.

When trying to heat CFRP structures by electromagnetic induction, the poor electrical properties of the carbon fibers and the polymer matrix do not allow for strong eddy currents to form inside the material; hence, little or no heat at all is generated in the material.

SUMMARY OF THE INVENTION

The ice protection device object of the invention is suitable for an aircraft surface having a composite layer. The device comprises a layer of electrically conductive material configured for being located at the outer face of the composite layer and adapted for being heated by electromagnetic induction. It is considered that the outer face is the face closer to the exterior of the aircraft surface once the CFRP layer or panel has been located in its final position.

The device comprises:

a perimetric monophasic winding configured for heating the edge surrounding a delimited area of the electrically conductive layer, an inner monophasic or multiphasic winding configured for heating the inside of the delimited area of the electrically conductive layer defined by the perimetric monophasic winding, a control unit, for independently controlling the perimetric monophasic winding and the inner monophasic or multiphasic winding, the control unit being configured such that it continuously operates the perimetric monophasic winding to avoid the formation of ice in the edge of the delimited area and such that it operates the inner monophasic or multiphasic winding when the ice formed in the delimited area has, or is, to be detached.

An object of this invention is to provide a detailed solution to the heating of a CFRP structure based on: (a) the inclusion of an electrically conductive layer to a CFRP (or any other type of non-electrically conductive composite material) panel's external surface in order to make it susceptible of heating by electromagnetic induction, and (b) a certain winding distribution pattern that distributes heat in a controlled manner, allowing the creation of vertical and horizontal heated strips between the heated zones.

Therefore, the perimetric monophasic winding allows the definition of a delimited zone in which the edge is permanently heated, such that in the surrounding limits of the area the formation of ice is avoided. The surrounding limits are known as strips. Thus the size of the formed piece of ice is controlled.

When ice is formed inside the delimited area, the inner monophasic or multiphasic winding is operated and it heats the aircraft surface so as to detach the piece of ice.

When a CFRP panel including such an electrically conductive layer on its outer face is submitted to electromagnetic induction, eddy currents form in the electrically conductive material, directly heating the panel on its external face. One additional advantage of this invention is that induction windings can be placed at the inner face of the CFRP panel, while the heat is generated in the outer surface; hence not requiring any heat transmission by conduction between the inner and outer parts of the panel, which enables a high overall efficiency.

The induction windings could be placed at the inner part of the composite layer instead of being embedded in the composite layer. The advantage of this configuration is that maintenance tasks are simpler due to its location at the inner part of, for instance, the leading edge, access is achieved by just detaching the leading edge as the induction windings are not embedded in the CFRP panel.

Additionally, the ice protection device could be configured as a set of different modules formed by a perimetric monophasic winding and the group of inner windings located inside the outer winding. This configuration has also the advantage that maintenance of damaged parts could be performed by removing only the affected modules.

Another possibility would be to also divide the CFRP panel into modules and to locate the winding embedded in the CFRP panel.

Another important advantage is that, by combining a specific winding design and the appropriate AC current control logic, the heating output can be precisely controlled and efficiently delivered to different target areas.

As such, the invention can prove a more effective and efficient way to protect aerodynamic surfaces from ice formation than other currently employed solutions.

The invention allows minimizing weight and maximizing the equivalent resistance of the electrical transformer formed between the metallic layer and the induction windings.

It is also an object of the invention an aircraft surface that comprises a composite layer and the device previously described.

It is a further object of the invention an ice protection method for an aircraft surface comprising a composite layer and a layer of electrically conductive material configured for being located at the external surface of the composite layer and adapted for being heated by electromagnetic induction, characterized in that the aircraft surface comprises:

a perimetric monophasic winding configured to heat an edge surrounding a delimited area of the electrically conductive layer, an inner monophasic or multiphasic winding configured to heat the inside of the delimited area defined by the perimetric monophasic winding.

The method further comprises the steps of continuously operating the first monophasic winding by a control unit to avoid the formation of ice in the edge of the delimited area and the second monophasic or multiphasic winding when the ice formed in the area defined by the first phase winding has, or is, to be detached.

BRIEF DESCRIPTION OF THE DRAWINGS

To complete the description and in order to provide for a better understanding of the invention, a set of drawings is provided. The drawings form an integral part of the description and illustrate preferred embodiments of the invention. The drawings comprise the following figures.

FIG. 4 shows a schematic perspective representation of the embodiment shown in FIG. 3 when the perimetric monophasic windings are operated.

FIG. 5 shows a schematic perspective representation of the embodiment shown in FIG. 3 when the sets of inner biphasic windings are operated.

DETAILED DESCRIPTION OF THE PREFERRED EMBODIMENTS

Figure 2:
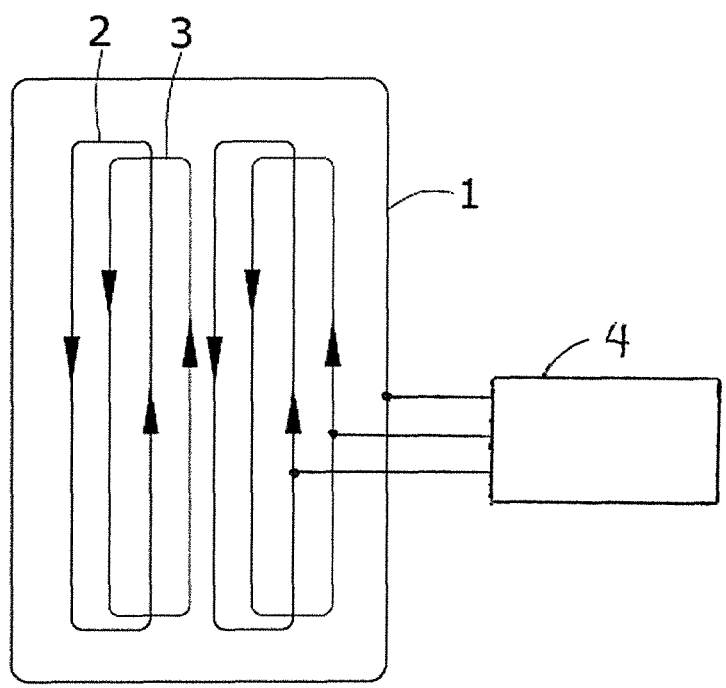
FIG. 2 shows a schematic representation of an embodiment of a phase winding distribution module, having a perimetric monophasic winding and two inner biphasic windings.

FIG. 2 shows an embodiment of the ice protection device object of the invention. More specifically it shows the following phase winding distribution:

a perimetric monophasic winding (1) configured for heating the edge surrounding a delimited area of the electrically conductive layer (12), an inner biphasic winding (2, 3) located inside the delimited area defined by the outer phase winding (1) and having two phases (2, 3) with a phase difference from each other.

Figure 3:
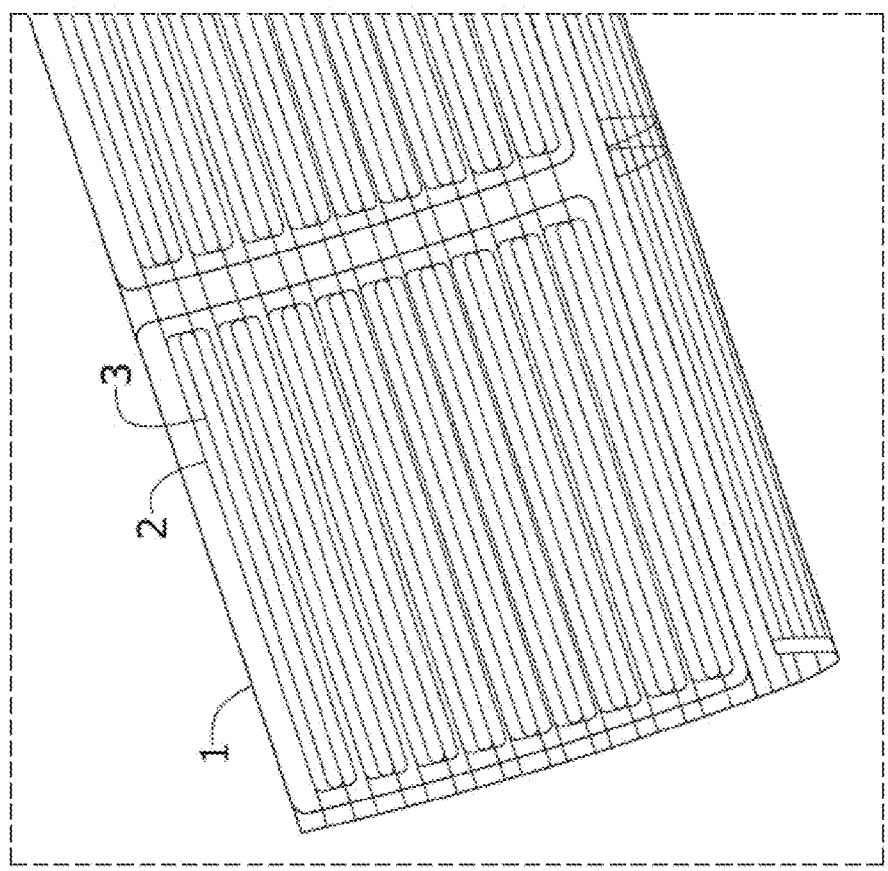
FIG. 3 shows a schematic perspective representation of an embodiment of the overall winding layout along an aerodynamic surface of an aircraft, four modules (four perimetric monophasic windings and four sets of inner biphasic windings).

FIG. 2 discloses two inner biphasic windings (2, 3) which are located inside the same perimetric monophasic winding (1) and having the same phase difference between both phases (2, 3). FIG. 3 discloses four perimetric monophasic windings (1), each perimetric monophasic windings (1) surrounding a set of inner biphasic windings (2, 3).

The two phases (2, 3) of the inner biphasic winding (2, 3) are geometrically and temporally displaced from each other.

The device comprises:

a perimetric monophasic winding (1) configured for heating the edge surrounding a delimited area of the electrically conductive layer, an inner monophasic or multiphasic winding (2,3) configured for heating the inside of the delimited area of the electrically conductive layer defined by the perimetric monophasic winding, a control unit (4), for independently controlling the perimetric monophasic winding (1) and the inner monophasic or multiphasic winding (2,3), the control unit being configured such that it continuously operates the perimetric monophasic winding to avoid the formation of ice in the edge of the delimited area and such that it operates the inner monophasic or multiphasic winding when the ice formed in the delimited area has, or is, to be detached.

The outer phase winding (1) of the disclosed embodiment comprises a squared shape and the phases (2, 3) of the set of inner biphasic windings comprises an elongated shape so as to cover the inside area of the outer phase winding (1). Additional biphasic windings (2, 3) could be arranged and a more uniform heating would be reached.

Additionally, both first and second phases (2, 3) of each inner biphasic winding are overlapped such that the ascending phase of the second phase (3) is located inbetween the ascending and descending phases of the first phase (2).

Moreover, the first phase (2) and the second phase (3) are temporally displaced in 90°, such that at 0° it is the ascending phase of the first phase (2), at 90° the current ascending phase of the second phase (3), at 180° the descending phase of the first phase (2) and at 270° the descending phase of the second phase (3).

Finally, the current flowing through both first and second phases has to be equal. All the first phases (2) are fed together and all the second phases (3) are also fed together.

With the geometrical and temporal displacement the magnetic field generated in the CFRP laminate is uniform, as well as the current density and consequently the induced losses. The windings distribution allows the achievement of a controlled heating distribution and therefore a modular winding distribution is proposed.

Another advantage is that as the above distribution is modular, understanding for a module the set formed by a perimetric monophasic winding (1) and at least an inner monophasic or multiphasic winding (2, 3) located inside.

When the inner phase winding (2, 3) is operating, the ice is detached from the surface. Since the outer phase winding (1) is continuously operating, the formation of ice in the horizontal and vertical strips is avoided, hence dividing the ice formation into segments and limiting its maximum size.

An additional advantage is that since the inner phase winding (2, 3) is operated in a pulsed way it is not necessary to have all modules fed at once and they can be fed sequentially, so that the peak power required is lowered.

In order to achieve the metallic layer (12) in the CFRP laminate, two different methods can be used:

Inclusion of a metallic mesh or foil.
Projection of metallic particles.

The thickness of such layer (12), when combined with the proposed winding arrangement, can be as low as 0.01 mm For the projection of metallic particles, depending on the metallic material used, it may be required to introduce an intermediate layer (11) between the CFRP laminate (10) and the metallic layer. This intermediate layer (11) can be an adhesive or a thermoplastic projected onto the CFRP laminate (10) surface. Projection of both the thermoplastic (11) and the metallic layer (12) is typically performed by high velocity oxygen fuel (HVOF) coating.

Figure 1:
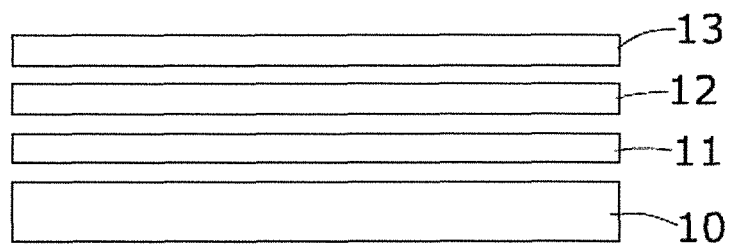
FIG. 1 shows a schematic representation of a cross-section of the different layers of the aircraft surface having the ice protection device.

Depending on the metallic material used and its thickness, an additional adhesive layer (13) may be required on top of the metallic layer (12), as shown in FIG. 1.

For the inclusion of a metallic mesh or foil an adhesive layer (11) has to be included between the CFRP laminate (10) and the metallic layer (12).

The metallic materials that can be used for such application are:

Iron based alloys (e.g., AISI304, AISI316)
Nickel
Aluminum

Additional layers (13) of non-conductive materials can be added on top of the metallic layer (12), such as paint, without modifying the composite panel's electromagnetic response.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An ice protection device for an aircraft surface having a composite layer, the device comprising:
   a layer of electrically conductive material configured and located at an outer face of the composite layer and being heated by electromagnetic induction,
   a perimetric monophasic winding configured to heat an edge surrounding a delimited area of the electrically conductive layer,
   an inner monophasic or multiphasic winding configured for heating an inside of the delimited area of the electrically conductive layer defined by the perimetric monophasic winding,
   a control unit, for independently controlling the perimetric monophasic winding and the inner monophasic or multiphasic winding, said control unit being configured such that the control unit is adapted for continuously operating the perimetric monophasic winding to avoid a formation of ice in the edge of the delimited area and the control unit is also adapted for operating the inner monophasic or multiphasic winding when the ice formed inside the delimited area is to be detached.

2. The ice protection device according to claim 1, wherein the perimetric monophasic winding and the inner monophasic or multiphasic windings are placed at an inner face of the composite layer.

3. The ice protection device according to claim 1, further comprising a modular distribution, each module comprising a perimetric monophasic winding and at least one inner monophasic or multiphasic winding.

4. The ice protection device according to claim 1, wherein phases of the inner multiphasic winding are geometrically displaced between the phases.

5. The ice protection device according to claim 1, wherein currents feeding phases of the inner multiphasic winding are temporally displaced between the phases.

6. The ice protection device according to claim 1, wherein current flowing through each phase of the inner multiphasic winding is equal for each phase.

7. The ice protection device according to claim 1, wherein the inner multiphasic winding is biphasic.

8. The ice protection device according claim 7, wherein a first phase and a second phase of the biphasic winding are temporally displaced 90° from each other.

9. The ice protection device according to claim 1, wherein the layer of electrically conductive material is a metallic mesh.

10. The ice protection device according to claim 1, wherein the layer of electrically conductive material is formed by metallic particles.

11. The ice protection device according to claim 1, further comprising an adhesive layer located between the composite layer and the layer of electrically conductive material.

12. The ice protection device according to claim 1, further comprising an additional adhesive layer located on top of the layer of electrically conductive material.

13. The ice protection device according to claim 1, further comprising an additional paint layer on top of the layer of electrically conductive material.

14. An aircraft surface comprising a composite layer and an ice protection device for the aircraft surface, the device comprising:
   a layer of electrically conductive material configured and located at an outer face of the composite layer and being heated by electromagnetic induction,
   a perimetric monophasic winding configured to heat an edge surrounding a delimited area of the electrically conductive layer,
   an inner monophasic or multiphasic winding configured for heating an inside of the delimited area of the electrically conductive layer defined by the perimetric monophasic winding, a control unit, for independently controlling the perimetric monophasic winding and the inner monophasic or multiphasic winding, said control unit being configured such that the control unit is adapted to continuously operate the perimetric monophasic winding to avoid formation of ice in the edge of the delimited area and the control unit is also adapted to operate the inner monophasic or multiphasic winding when the ice formed inside the delimited area is to be detached.

15. An ice protection method for an aircraft surface comprising a composite layer and a layer of electrically conductive material configured and located at an external surface of the composite layer and adapted to be heated by electromagnetic induction, wherein the aircraft surface comprises:

a perimetric monophasic winding configured to heat an edge surrounding a delimited area of the electrically conductive layer, an inner monophasic or multiphasic winding configured to heat an inside of the delimited area defined by the monophasic winding, the method comprising the steps of:

continuously operating the perimetric monophasic winding by a control unit to avoid the formation of ice in the edge of the delimited area, and operating the inner monophasic or multiphasic winding when the ice formed in the area defined by the perimetric monophasic winding is to be detached.

* * * * *